United States Patent [19]

Inoue et al.

[11] Patent Number: 4,908,151
[45] Date of Patent: Mar. 13, 1990

[54] OXYGEN ABSORBENT

[75] Inventors: Yoshiaki Inoue; Toshio Komatsu, both of Tokyo, Japan

[73] Assignee: Mitsubishi Gas Chemical Co., Inc., Japan

[21] Appl. No.: 155,283

[22] Filed: Feb. 12, 1988

[30] Foreign Application Priority Data

Feb. 14, 1987 [JP] Japan .................................. 62-30680
Sep. 9, 1987 [JP] Japan ................................ 62-224082

[51] Int. Cl.$^4$ .......................... A23L 3/34; B01J 20/22; C09K 15/32; C09K 15/06
[52] U.S. Cl. ............................... 252/188.28; 426/541; 426/312; 252/400.5; 252/400.52; 252/400.54; 252/400.61; 252/400.2; 252/407; 252/400.53; 252/400.1
[58] Field of Search ................................... 252/188.28

[56] References Cited

U.S. PATENT DOCUMENTS

| 4,073,861 | 2/1978 | Cilento et al. | 252/188.28 X |
| 4,113,652 | 9/1978 | Yoshikawa et al. | 252/188.28 X |
| 4,299,719 | 11/1981 | Aoki et al. | 252/188.28 |
| 4,406,813 | 9/1983 | Fujishima et al. | 252/188.28 |
| 4,588,561 | 5/1986 | Aswell et al. | 252/188.28 X |
| 4,657,740 | 4/1987 | Feldman | 252/390 X |
| 4,721,581 | 1/1988 | Ramachandran et al. | 252/135 |

FOREIGN PATENT DOCUMENTS

| 2742874 | 4/1979 | Fed. Rep. of Germany . | |
| 55-018222 | 2/1980 | Japan | 252/188.28 |
| 56-148271 | 11/1981 | Japan . | |
| 56-155641 | 12/1981 | Japan . | |

OTHER PUBLICATIONS

JPO Abstract of Japanese patent application Laid-Open No. SHO 56—148271, Nov. 17, 1981.
JPO Abstract of Japanese patent publication 61—285973, Dec. 16, 1986.
T. E. Graedel et al., "On the Mechanism of Silver and Copper Sulfidation by Atmospheric H$_2$S and OCS", Corrosion Science, 25 Issue No. 12, pp. 1163–1180 (1985).

*Primary Examiner*—Brooks H. Hunt
*Assistant Examiner*—Virginia B. Caress
*Attorney, Agent, or Firm*—Leydig, Voit & Mayer

[57] ABSTRACT

The present invention relates to an oxygen absorbent, and more particularly to an oxygen absorbent applicable to preservation of dry foodstuffs and medical drugs and to the rust prevention of metallic articles. Thus, the invention provides an oxygen absorbent comprising:

($A_1$) an unsaturated fatty acid and/or a fatty oil containing unsaturated fatty acid,
($B_1$) a transition metal and/or a transition metal compound, and
($C_1$) a basic substance, and an oxygen absorbent comprising:

($A_2$) one member or a mixture of two or more members selected from unsaturated fatty acid compounds including unsaturated fatty acids, esters of unsaturated fatty acid and metallic salts of unsaturated fatty acid,
($B_2$) a basic substance, and
($C_2$) an adsorbent.

15 Claims, No Drawings

OXYGEN ABSORBENT

BACKGROUND OF THE INVENTION

The present invention relates to an oxygen absorbent, and more particularly to an oxygen absorbent applicable to the preservation of dry foodstuffs or medical drugs and to rust prevention of metallic articles.

DESCRIPTION OF THE PRIOR ART

As a technique for preservation of foodstuffs, the use of an oxygen absorbent is known. According to this technique, a foodstuff and a gas-permeable package filled with an oxygen absorbent are sealed in a gas-barrier packaging material, and the inner atmosphere of the sealed system is substantially made oxygen-free in order to prevent the oxidation of the foodstuff, particularly the oxidation and color change of fatty oils in the foodstuff, and the growth and multiplication of bacteria and mildew. Today, this technique is widely used in the preservation of foodstuffs.

A number of substances have hitherto been proposed as this oxygen absorbent. Examples of the absorbent hitherto disclosed include those mainly composed of sulfite, bisulfite, ferrous salt, dithionite, hydroquinone, catechol, resorcin, pyrogallol, gallic acid, Rongalit, ascorbic acid and/or its salt, isoascorbic acid and/or its salt, sorbose, glucose, lignin, dibutylhydroxytoluene, butylhydroxyanisole, metallic powder and the like.

However, the above-mentioned hitherto known oxygen absorbents have a general disadvantage that their oxygen-absorbing reaction does not progress in the absence of water. In other words, the hitherto known oxygen absorbents can absorb oxygen only when they are mixed with water or a water-holding compound such as compounds having crystalline water or when the water evaporated from the foodstuff to be stored can be utilized.

Accordingly, when the above-mentioned oxygen absorbents are applied to preservation of dry foodstuffs and medical drugs extremely sensitive to the migration of water, the quality of the article can be deteriorated due to migration of water. Further, even if the oxygen absorbent once absorbs oxygen, the oxygen-absorbing performance of the absorbent is gradually lost as its water content decreases due to migration, so that the quality of the article can be gradually deteriorated due to the small quantity of oxygen permeating the packaging film.

Further, when the above-mentioned oxygen absorbent is applied to preservation of metallic articles, the water vaporizing from the oxygen absorbent can form rust on the surface of metal which makes it impossible to achieve the intended rust prevention.

As an attempt to overcome the above-mentioned disadvantages of prior oxygen absorbents, an oxygen absorbent prepared by supporting an unsaturated fatty acid or a fatty oil containing unsaturated fatty acid on a porous carrier is proposed in Japanese Patent Application Kokai (Laid-Open) No. 155,641/81.

However, the oxygen absorbent mentioned there is disadvantageous in that its oxygen absorbing velocity is low, it emits a remarkably unpleasant odor and it has no drying performance.

SUMMARY OF THE INVENTION

It is the object of the present invention to provide an oxygen absorbent able to solve the above-mentioned problems, easy to handle, having a high oxygen absorbing velocity and a drying performance, emitting no unpleasant odor, and applicable to dry foodstuffs, medical drugs and metallic articles.

The present inventors conducted many studies on an oxygen absorbent comprising an unsaturated fatty acid compound easy to handle, improved in oxygen absorption velocity, having a drying performance and prevented from emission of unpleasant odor. As a result, the present invention was accomplished.

Thus, the present invention provides an oxygen absorbent comprising:

($A_1$) an unsaturated fatty acid and/or an fatty oil containing an unsaturated fatty acid, ($B_1$) a transition metal and/or a transition metal compound, ($C_1$) a basic substance, and an oxygen absorbent comprising:

($A_2$) one member or a mixture of two or more members selected from unsaturated fatty acid compounds including unsaturated fatty acids, esters of unsaturated fatty acid and metallic salts of unsaturated fatty acid, ($B_2$) a basic substance, and ($C_2$) an adsorbent.

The latter (second) oxygen absorbent is an improvement of the former (first) one.

In the first oxygen absorbent of the invention, ingredient ($A_1$) is composed of an unsaturated fatty acid and/or a fatty oil containing an unsaturated fatty acid. It is the main ingredient reacting with oxygen in the system.

As the unsaturated fatty acids usable in the invention, those having 10 or more carbon atoms are preferable. Their examples include unsaturated fatty acids such as Tohaku acid*, linderic acid*, tsuzuic acid*, oleic acid, linoleic acid, linolenic acid, arachidonic acid, parinaric acid, dimer acid*, ricinoleic acid and the like. Among them, oleic acid, linoleic acid and linolenic acid are particularly preferable. These unsaturated fatty acids may be used either alone or in the form of a mixture of two or members, and their mixture with saturated fatty acid is also usable.

Note: * shows idiomatic name (K. F. Markley, "Fatty Acids", part I-V, Interscience (1960–1968), "Fatty Chemical Handbook" Japanese Oil Chemical Society editing, second revision, page 13, table 1.16).

As the fatty oil containing an unsaturated fatty acid used in the invention, animal and vegetable oils which contain a large quantity of triglycerides of unsaturated fatty acids can be referred to. Among them, vegetable oils such as linseed oil, soybean oil, tung oil, rice bran oil, sesame oil, tall oil, cotton seed oil, rape see oil and the like are preferable. These fatty oils containing unsaturated fatty acids may be used either alone or in the form of a mixture of two or more members.

In the invention, ingredient ($B_1$) is composed of a transition metal and/or a transition metal compound, and it accelerates the oxidation of the above-mentioned main ingredient. (Hereinafter, ingredient ($B_1$) will be referred to as "catalyst" sometimes.)

As the transition metal used in the invention, at least one transition metal selected from the group consisting of V, Cr, Mn, Co, Fe, Ni, Cu and Zn is preferable from the viewpoint of the oxidation-accelerating activity on the main ingredient. Among them, Fe is particularly preferred from the viewpoint of safety and hygiene.

As the transition metal compound used in the invention, carbonates, bicarbonates, oxides, hydroxides, halides, complex salts and organic acid salts of transition metals can be referred to. Among them, organic acid salts are preferable. From the viewpoint of oxidation-accelerating activity, at least one transition metal compound selected from the group consisting of V compounds, Cr compounds, Mn compounds, Co compounds, Fe compounds, Ni compounds, Cu compounds and Zn compounds is preferable. Among them, Fe compounds are particularly preferred from the viewpoint of safety and hygiene.

In the invention, the basic substance constituting ingredient ($C_1$) reacts with the unsaturated fatty acid compound to solidify it. For example, owing to such an action of the basic substance, the solidified oxygen absorbent can be pulverized into granule or powder which can be packaged into gas-permeable small-sized bag, and thereby the handling of the oxygen absorbent itself can be greatly simplified. Further, the basic substance captures the organic acid formed by the reaction between fatty acid compound and oxygen and thereby prevents the emission of unpleasant odor.

Examples of the basic substance usable as ingredient ($C_1$) of the invention include oxides, hydroxides, carbonates, bicarbonates, phosphates, silicates, organic acid salts and the like of alkaline earth metals and alkali metals; oxide, hydroxide, carbonate, phosphate, silicate, organic acid salt and the like of aluminum; ammonia and ammonium slats of which aqueous solutions' pH are greater than 7, organic basic substances such as polyethyleneimine, guanidine carbonate, melamine and the like; and organic amine compounds such as 2,4,6-tri (dimethylaminomethyl)-phenol, α-n-butylpyrrolidine and the like. Among them, basic substances composed of alkaline earth metals are preferable, and basic substances composed of calcium or magnesium compounds are more preferable, and magnesium oxide, magnesium hydroxide, calcium oxide, calcium hydroxide, calcium carbonate and calcium salts of organic acids are most preferable.

When the basic substance is a bicarbonate or a carbonate, the absorption of oxygen is accompanied by a generation of carbon dioxide, owing to which the decrease in volume or reduction in pressure of the sealed system due to absorption of oxygen can be prevented. When said basic substance is a substance having water-absorbing character such as calcium oxide or magnesium oxide, the oxygen absorbent can have a drying performance in addition to the oxygen absorbing performance.

In producing the first oxygen absorbent of the invention, an unsaturated fatty acid or a fatty oil containing unsaturated fatty acid is compounded with a catalyst and a basic substance, and the resulting mixture is homogenized.

In compounding the ingredients, the catalyst is used in an amount of 0.01 part by weight or more and preferably 0.05 part by weight or more and the basic substance is used in an amount of 0.1 part by weight or more and preferably 1 part by weight or more per 100 parts by weight of the unsaturated fatty acid or fatty oil containing unsaturated fatty acid. By adopting such a compounding ratio, the unsaturated fatty acid or fatty oil containing unsaturated fatty acid becomes solid which can be made into granule or powder by pulverization. Thus, the workability can be improved in filling an oxygen absorbent into a packaging material to prepare a packaged oxygen absorbent.

In the second oxygen absorbent of the invention, ingredient ($A_2$) is composed of an unsaturated fatty acid compound. It is the main ingredient reacting with oxygen present in the system.

As the unsaturated fatty acid compound, unsaturated fatty acids, esters of unsaturated fatty acid and metallic salts of unsaturated fatty acid are used. They can be used either alone or in the form of a mixture of two or more members. Preferably, a metallic salt of an unsaturated fatty acid, a mixture of an unsaturated fatty acid and a metallic salt of an unsaturated fatty acid, a mixture of an ester of an unsaturated fatty acid and a metallic salt of an unsaturated fatty acid, and the like are used.

The unsaturated fatty acid used in the invention preferably has 10 or more carbon atoms. Preferable examples of the unsaturated fatty acid include Tohaku acid, linderic acid, tsuzuic acid, oleic acid, linoleic acid, linolenic acid, arachidonic acid, parinaric acid, dimer acid, ricinoleic acid and the like. Among them, oleic acid, linoleic acid and linolenic acid are particularly preferable. These unsaturated fatty acids may be used either alone or in the form of a mixture of two or more members. Fatty acids obtained from the vegetable and animal oils which contain a large amount of triglyceride of unsaturated fatty acid such as linseed oil, soybean oil, tung oil, rice bran oil, sesame oil, tall oil cotton seed oil, rape seed oil and the like, i.e. linseed oil fatty acid, soybean oil fatty acid, tung oil fatty acid, rice bran oil fatty acid, sesame oil fatty acid, cotton seed oil fatty acid, rape seed oil fatty acid and the like, are also usable. The unsaturated fatty acid may be contaminated by saturated fatty acids.

As the ester of unsaturated fatty acid, animal and vegetable oils which contain a large amount of triglyceride of unsaturated fatty acid can be referred to. Among them, vegetable oils such as linseed oil, soybean oil, tung oil, rice bran oil, sesame oil, tall oil, cotton seed oil, rape seed oil and the like are preferable. These esters of unsaturated fatty acid may be used either alone or in the form of a mixture of two or more members.

The metallic salt of unsaturated fatty acid includes metallic salts of various unsaturated fatty acids.

As the metallic salt of unsaturated fatty acid, metallic salts of fatty acids derived from animal and vegetable oils which contain a large amount of triglyceride of unsaturated fatty acid, such as alkaline earth metal salts, alkali salts, transition metal salts, aluminum salts and the like of the unsaturated fatty acids derived from linseed oil, soybean oil, tung oil, rice bran oil, sesame oil, tall oil, cotton seed oil, rape seed oil and the like can be referred to. Among them, transition metal salts are preferable, and iron salts are more preferable from the viewpoint of safety and hygiene.

As the unsaturated fatty acid component constituting said metallic salt of unsaturated fatty acid, not only those derived from the above-mentioned animal and vegetable oils but also the unsaturated fatty acids constituting the main component of the above-mentioned animal and vegetable oils are usable. As the unsaturated fatty acid component, those having 10 or more carbon atoms are preferable, of which examples include Tohaku acid, linderic acid, tsuzuic acid, oleic acid, linoleic acid, linolenic acid, arachidonic acid, parinaric acid, dimer acid, ricinoleic acid and the like. Particularly preferable are oleic acid, linoleic acid and linolenic acid. The metallic salts of unsaturated fatty acid may be used either alone or in the form of a mixture of two or more members.

In the second oxygen absorbent of the invention, as the basic substance constituting ingredient ($B_2$), just the same basic substances mentioned above in the paragraph of ingredient ($C_1$) can be used, in addition to which carbonates, oxides, hydroxides and bicarbonates of transition metals can also be used.

When the basic substance is a bicarbonate or a carbonate, the absorption of oxygen is accompanied by a generation of carbon dioxide, owing to which the decrease in volume or reduction in pressure of the sealed system due to absorption of oxygen can be prevented.

In the oxygen absorbent of the invention, the basic substance of ingredient ($B_2$) reacts with the unsaturated fatty acid compound and thereby solidifies it. For example, the oxygen absorbent thus solidified can be made into granule or powder by pulverization and filled into a gas-permeable small-sized bag, owing to which the oxygen absorbent itself can be made easy to handle. Further, the basic substance captures the organic acid formed by the reaction between the fatty acid compound and oxygen and prevents the emission of unpleasant odor.

As the adsorbent, i.e. ingredient ($C_2$), of the invention, substances capable of adsorbing water and/or the unpleasant odor components generated upon oxygen absorption of the unsaturated fatty acid compound are preferably used. Preferable concrete examples of said adsorbent include silicic acid compounds such as silica gel, natural zeolite, synthetic zeolite, active clay and the like, as well as active charcoal, activated alumina, and the like. Among them, silica gel, activated alumina and active charcoal are particularly preferable. These adsorbents may be used either alone or in the form of a mixture of two or more members. Particle diameter of the adsorbent is preferably 10 mm or less and more preferably 5 mm or less. The shape of the adsorbent is not critical. An adsorbent which has been heat treated at a temperature of 50° C. or above is preferable, and that which has been heat treated at a temperature of 100° C. or above is more preferable.

Ingredient ($C_2$) adsorbs water and at the same time the unpleasant odor components formed by the oxygen absorption of unsaturated fatty acid compound, owing to which it gives the oxygen absorbent a drying performance and prevents the emission of unpleasant odor.

In the second oxygen absorbent of the invention, the basic substance is used preferably in an amount of 0.1 to 1,000 parts by weight and more preferably in an amount of 1 to 500 parts by weight and the adsorbent is used preferably in an amount of 50 to 2,000 parts by weight and more preferably in an amount of 100 to 1,000 parts by weight, both per 100 parts by weight of the unsaturated fatty acid compound.

According to one preferable embodiment of the invention, the second oxygen absorbent is produced by mixing an unsaturated fatty acid compound with a basic substance and an adsorbent, thereby making the unsaturated fatty acid compound into a solid material, and then pulverizing the solid material into a powder or a granule which can be packaged into a small-sized gas-permeable bag.

The second oxygen absorbent of the invention may be filled and packaged into a small-sized gas-permeable bag as it is. Alternatively, it may also be filled and packaged into a small-sized gas-permeable bag after adding thereto an additional amount of adsorbent ingredient.

The first and second oxygen absorbents of the invention can be put to use by introducing them into a package containing a prior oxygen absorbent. In case of dry foodstuffs, it is also possible to remove the oxygen present in the initial package with an oxygen absorbent composed mainly of, for example, iron powder and thereafter remove the oxygen permeating the packaging film with the oxygen absorbent of the invention.

DESCRIPTION OF THE PREFERRED EMBODIMENT

Hereunder, the invention will be illustrated in more detail with reference to the following examples.

Examples 1 to 10

A catalyst was added to various unsaturated fatty acids or fatty oils containing unsaturated fatty acid, and the resulting mixtures were homogenized. Then, a basic substance was added thereto, and the resulting mixtures were homogenized. The compounding ratios of the ingredients were as shown in Table 1. The compounded mixtures thus obtained were allowed to stand at 25° C. for 10 minutes, until they solidified. The solidified materials were pulverized in a mortar. Each of the granular oxygen absorbent compositions thus obtained was filled into a small-sized bag (5×7.5 cm in size) made of a composite material of paper/porous polyethylene film, and the peripheral parts of the bag were heat-sealed to obtain a packaged oxygen absorbent (hereinafter, the packaged oxygen absorbents obtained herein are referred to as "packaged oxygen absorbents 1 to 10").

Each of the packaged oxygen absorbents 1 to 10 was sealed into a KON (oriented nylon coated with polyvinylidene chloride)/PE (polyethylene) bag and stored at 25° C., and the oxygen concentration in the bag was followed in the lapse of time (oxygen absorption rate). The oxygen concentration was measured by sampling the gas in the bag and analyzing it by gas chromatography. The results were as shown in Table 1.

Comparative Example 1

An oxygen absorbent was prepared by adding 5 parts by weight of $FeSO_4$ as a catalyst to 30 parts by weight of linoleic acid and supporting the mixture on 100 parts by weight of granular active charcoal (this oxygen absorbent is mentioned in Japanese Patent Application Kokai (Laid-Open) No. 155,641/81. Using 4.5 g of this oxygen absorbent (containing 1 g of linoleic acid), a packaged oxygen absorbent was prepared by the same procedure as mentioned in Example 1, and its oxygen absorption velocity was measured. The results are also shown in Table 1.

It is apparent from the above-mentioned results that Examples 1 to 10 are superior to Comparative Example 1 in oxygen absorbing effect.

TABLE 1

| | Oxygen absorbent composition | | | Result of measurement | |
|---|---|---|---|---|---|
| | Unsaturated fatty acid or fatty oil containing unsaturated fatty acid | Catalyst | Basic substance | Oxygen concentration in KOP/PE bag | |
| | Kind (Weight) | Kind (Weight) | Kind (Weight) | 12 hrs. | 24 hrs. |
| Ex. 1 | Oleic acid (1 g) | Fe oleate (1 g) | Ca(OH)$_2$ (0.2 g)$^2$ | 7.3 | ≦0.1 |
| Ex. 2 | Oleic acid (1 g) | Fe oleate (1 g) | CaCO$_3$ (0.2 g) | 8.4 | ≦0.1 |
| Ex. 3 | Oleic acid (1 g) | Fe oleate (0.01 g) | NaHCO$_3$ (0.2 g) | 9.2 | ≦0.1 |
| Ex. 4 | Oleic acid (1 g) | Mn oleate (0.01 g) | Ca(OH)$_2$ (0.05 g) | 8.0 | ≦0.1 |
| Ex. 5 | Linoleic acid (1 g) | Fe oleate (0.1 g) | Ca(OH)$_2$ (0.1 g) | 6.5 | ≦0.1 |
| Ex. 6 | Linoleic acid (1 g) | Fe oleate (0.1 g) | Ca(OH)$_2$ (0.1 g) | 6.1 | ≦0.1 |
| Ex. 7 | Dehydrated caster oil (1 g) | Fe oleate (0.1 g) | Ca(OH)$_2$ (0.1 g) | 8.9 | ≦0.1 |
| Ex. 8 | Soybean oil (1 g) | Fe oleate (0.1 g) | CaO (0.1 g) | 8.5 | ≦0.1 |
| Ex. 9 | Oleic acid (1 g) | Fe oleate (1 g) | Mg(OH)$_2$ (0.2 g) | 7.5 | ≦0.1 |
| Ex. 10 | Oleic acid (1 g) | Fe oleate (1 g) | MgO (0.1 g) | 9.5 | ≦0.1 |
| Comp. 1 | Linoleic acid (1 g) | FeSO$_4$ (0.17 g) | Granular active charcoal (3.3 g) | 13.1 | 4.8 |

Ex. 1–10: Example 1–10; Comp. 1: Comparative Example 1
Ex. 3: CO$_2$ concentration in KOP/DE bag was 7% at 12 hrs. and 10% at 24 hrs.

Examples 11 to 20

In order to study the oxygen-absorbing effect brought about by the combined use of silica gel and packaged oxygen absorbent of the present invention, each of the packaged oxygen absorbents 1 to 10 obtained in Examples 1 to 10 was sealed into a bag of KON/PE film (8 cm×25 cm, oxygen permeability 50 ml/atm.m$^2$.day) together with 100 g of silica gel and 250 ml of air, and stored at 25° C. The oxygen concentration in the bag was followed with lapse of time. The results are shown in Table 2, as Examples 11 to 20.

Comparative Example 2

The test of Example 11 was repeated, except that the packaged oxygen absorbent 1 obtained in Example 1 was replaced with the packaged oxygen absorbent obtained in Comparative Example 1. The results obtained herein are also shown in Table 2 as Comparative Example 2 in addition to the results of Examples 11 to 20.

It is apparent from these results that Examples 11 to 20 are superior to Comparative Example 2 in the oxygen absorption after 24 hours and the superiority in oxygen absorption is maintained in the combined use with silica gel.

TABLE 2

| Ex. No.[1] | Packaged oxygen absorbent No. | Oxygen concentration in bag (%) After 24 hrs. |
|---|---|---|
| 11 | 1 | ≦0.1 |
| 12 | 2 | ≦0.1 |
| 13 | 3 | ≦0.1 |
| 14 | 4 | ≦0.1 |
| 15 | 5 | ≦0.1 |
| 16 | 6 | ≦0.1 |
| 17 | 7 | ≦0.1 |
| 18 | 8 | ≦0.1 |
| 19 | 9 | ≦0.1 |
| 20 | 10 | ≦0.1 |
| Comp. 2 | | 4.8 |

[1]Ex No. = No. of Example

In the first oxygen absorbent of the invention, a catalyst (transition metal and/or transition metal compound) is added to an unsaturated fatty acid and/or a fatty oil containing unsaturated fatty acid and then a basic substance is added, owing to which the unsaturated fatty acid and the fatty oil containing unsaturated fatty acid solidify. By pulverizing the solidified material, a granule or a powder which can be filled into a small-sized bag of packaged oxygen absorbent in a high workability is obtained. Thus, it can bring about a greatly improved oxygen absorption velocity as compared with prior oxygen absorbents containing fatty oils, and it is successfully applicable to dry foodstuffs. Further, by selecting the basic substance appropriately, a drying performance and a carbon dioxide-generating performance can be given to the oxygen absorbent in addition to the oxygen absorbing performance.

Examples 21 to 29

According to the formulations shown in Table 3, various unsaturated fatty acid compounds, basic substances and adsorbents were uniformly mixed together. The compounded mixtures thus obtained were allowed to stand at 25° C. for 10 minutes, until they solidified. Then, they were pulverized in a mortar. Each of the granular oxygen absorbent compositions thus obtained was placed in a small-sized (5×7.5 cm) bag made of a composite packaging material (paper/porous polyethylene film) and the peripheral parts were heat sealed to prepare a packaged oxygen absorbent (hereinafter, the packaged oxygen absorbents herein obtained are referred to as "packaged oxygen absorbents 21 to 29").

Each of the above-mentioned packaged oxygen absorbents 21 to 29 was sealed into a KON (stretched nylon coated with polyvinylidene chloride)/PE (polyethylene) bag together with 250 ml of air and stored at 25° C., and the concentration of oxygen in the bag was followed in the lapse of time (oxygen absorption velocity). One day and 7 days after the sealing, the bag was unsealed and unpleasant odor was examined by an organoleptic test. The results are shown in Table 3.

The soybean oil fatty acid iron salt used in Examples 21 to 29 was prepared in the following manner.

At 90° C., 200 g of soybean oil was added to 310 g of 10% aqueous solution of sodium hydroxide together with 1 liter of water and saponified to obtain an aqueous solution of soybean oil fatty acid sodium salt. Thereto was added 500 g of 10% aqueous solution of ferric chloride to obtain 200 g of soybean oil fatty acid iron salt.

Comparative Example 3

An oxygen absorbent was prepared by supporting 1 g of soybean oil on 3 g of granular active charcoal together with 0.17 g of ferrous sulfate heptahydrate. Using this oxygen absorbent, a packaged oxygen absorbent was prepared in the same manner as in Example 21, and the same measurement and organoleptic test as in Example 21 were performed. The results of this example are also shown in Table 3 in addition to the results of Examples 21 to 29.

In Table 3, "Ex. 21–29" means Examples 21 to 29 and "Comp. 3" means Comparative Example 3.

It is apparent from these results that Examples 21 to 29 are superior to Comparative Example 3 in the oxygen absorbing effect and prevention of unpleasant odor.

TABLE 3

| | Oxygen absorbent composition | | | Result of measurement | |
|---|---|---|---|---|---|
| | Unsaturated fatty acid compound Kind (Weight) | Basic substance Kind (Weight) | Adsorbent Kind (Weight) | Oxygen concentration in bag[1] (%) | Organoleptic test[2] |
| Ex. 21 | Soybean oil fatty acid Fe salt (1 g) | Ca(OH)$_2$ (0.2 g) | Powdery active charcoal (1.5 g) | 3.5 * | — — |
| Ex. 22 | Soybean oil fatty acid Fe salt (0.5 g) Soybean oil fatty acid (0.5 g) | Ca(OH)$_2$ (0.2 g) | Powdery active charcoal (1.5 g) | 4.2 * | — — |
| Ex. 23 | Soybean oil fatty acid Fe salt (0.5 g) Soybean oil (0.5 g) | Ca(OH)$_2$ (5 g) | Powdery active charcoal (1.5 g) | 2.7 * | — — |
| Ex. 24 | Soybean oil fatty acid Fe salt (1 g) | Ca(OH)$_2$ | Silica gel | 3.0 | — |
| Ex. 25 | Soybean oil fatty acid Fe salt (1 g) | Ca(OH)$_2$ (0.2 g) | Powdery natural zeolite (2.5 g) | 3.5 * | — + |
| Ex. 26 | Soybean oil fatty acid Fe salt (1 g) | Ca(OH)$_2$ (0.01 g) | Powdery active charcoal (5 g) | 4.7 * | — — |
| Ex. 27 | Soybean oil fatty acid Fe salt (1 g) | Ca(OH)$_2$ (1 g) | Powdery active charcoal (0.5 g) | 2.5 * | + + |
| Ex. 28 | Soybean oil fatty acid Fe salt (1 g) | NaHCO$_3$ (0.2 g) | Active clay (2.5 g) | 5.0 * | + + |
| Ex. 28 | Soybean oil fatty acid Fe salt (1 g) | Mg(OH)$_2$ (0.2 g) | Powdery active charcoal (1.5 g) | 3.0 * | — — |
| Ex. 29 | Tall oil fatty acid Fe salt (1 g) | Mg(OH)$_2$ (0.6 g) | Powdery active charcoal (0.5 g) | 2.5 * | — — |
| Comp. 3 | Soybean oil (1 g) | FeSO$_4$.7H$_2$O (0.17 g) | Granular active charcoal (3 g) | 18.7 11.5 | ++ ++ |

[1]Oxygen concentration in bag: Upper figure denotes the value after 12 hrs, and lower figure denotes the value after 24 hrs.
[2]Organoleptic test: Upper mark denotes the evaluation on the first day, and lower mark denotes the evaluation on the seventh day.
Evaluation of unpleasant odor:
—: No unpleasant odor
+: A slight unpleasant odor
++: A considerable unpleasant odor.

Examples 30 to 39

An oxygen absorbent composition consisting of 1 g of soybean fatty acid iron salt, 1 g of Ca(OH)$_2$ and 0.5 g of powdery active charcoal was placed in a small-sized (7.5×7.5 cm) bag made of paper/porous polyethylene together with various adsorbents and peripheral parts of the bag were heat sealed to prepare packaged oxygen absorbents (hereinafter referred to as "packaged oxygen absorbents 30 to 39").

Using the packaged oxygen absorbents 30 to 39, the same measurement and test as in Example 21 were performed. The results are shown in Table 4.

All the adsorbents additionally used in Examples 30 to 39 were previously heat-treated for 30 minutes at the following temperatures: granular active charcoal: 105° C.; silica gel, natural zeolite and active clay: 200° C.; activated alumina: 300° C.

It is apparent from the above-mentioned results that Examples 30 to 39 are all excellent in oxygen absorbing effect and prevention of unpleasant odor similarly to Examples 21 to 29.

TABLE 4

| Absorbent Kind (Weight) | | Results of measurements | |
|---|---|---|---|
| | | Oxygen concentration in bag[1] (%) | Organoleptic test[2] |
| Ex. 30 | Granular active charcoal (1.5 g) | 4.7 * | — |
| Ex. 31 | Granular active charcoal (2.5 g) | 5.5 * | — |
| Ex. 32 | Silica gel (2.5 g) | 5.3 * | — |
| Ex. 33 | Silica gel (5 g) | 7.5 * | — |
| Ex. 34 | Activated alumina (2.5 g) | 3.5 * | — |
| Ex. 35 | Activated alumina (5 g) | 3.7 * | — |
| Ex. 36 | Natural zeolite (2.5 g) | 4.8 * | — |
| Ex. 37 | Natural zeolite (5 g) | 4.9 * | — |
| Ex. 38 | Active clay (2.5 g) | 5.1 * | — |
| Ex. 39 | Active clay (2.5 g) | 5.0 * | — |

[1]Oxygen concentration in bag: Upper figure denotes the value after 12 hrs. and lower figure denotes the value after 24 hrs.
[2]Organoleptic test: Upper mark denotes the evaluation on the first day and lower mark denotes that on the 7th day.
Evaluation of unpleasant odor:
−: No unpleasant odor
+: A slight unpleasant odor
++: A considerable unpleasant odor

Examples 40 to 49

Each of the above-mentioned packaged oxygen absorbents 30 to 39 was sealed into KON/PE bag together with about 20 g of dry vegetable (water content 1.21%, water activity 0.1 or below) and 250 ml of air and stored at 25° C. for 60 days. With the lapse of time, the change in the oxygen concentration in the bag and the changes in weight and water content of the dry vegetable were followed. The results are shown in Table 5.

Comparative Example 4

The test and measurement of Examples 40 to 49 were repeated, except that the packaged oxygen absorbents 30 to 39 were replaced with the packaged oxygen absorbent obtained in Comparative Example 3. The results of this example is also shown in Table 5 in addition to the results of Examples 40 to 49.

In Table 4, "Comp 4" means Comparative Example 4.

It is apparent from these results that Examples 40 to 49 are superior to Comparative Example 4 in oxygen absorbing effect and improved in the decrease in weight and decrease in water content as compared with the comparative example.

TABLE 5

| Example No. | Package[3] No. | Oxygen concentration in bag (%)[4] | | Change in weight of dry vegetable (g) | | Water content[5] (%) | |
|---|---|---|---|---|---|---|---|
| | | 24 hrs. | 48 hrs. | Before storage | After storage | Before storage | After storage |
| 40 | 9 | 4.2 | * | 20.17 | 20.14 | 1.21 | 1.06 |
| 41 | 10 | 5.0 | * | 20.03 | 20.00 | 1.21 | 1.06 |
| 42 | 11 | 5.4 | * | 19.85 | 19.75 | 1.21 | 0.72 |
| 43 | 12 | 7.7 | * | 20.02 | 19.93 | 1.21 | 0.76 |
| 44 | 13 | 4.1 | * | 19.93 | 19.88 | 1.21 | 0.95 |
| 45 | 14 | 4.5 | * | 19.95 | 19.90 | 1.21 | 0.96 |
| 46 | 15 | 4.2 | * | 20.00 | 19.95 | 1.21 | 0.96 |
| 47 | 16 | 4.8 | * | 19.91 | '19.87 | 1.21 | 1.01 |
| 48 | 17 | 5.1 | * | 21.01 | 21.00 | 1.21 | 1.16 |
| 49 | 18 | 5.0 | * | 20.47 | 20.45 | 1.21 | 1.11 |
| Comp. 4 | | 18.5 | 11.0 | 20.05 | 20.29 | 1.21 | 2.40 |

[3]Package No: No. of packaged oxygen absorbent
[4]Oxygen concentration in bag: * means "lower than 0.1%"
[5]Water content: Water content of dry vegetable The second oxygen absorbent of the present invention is a composition consisting of an unsaturated fatty acid compound, a basic substance and an adsorbent and it can easily be made into a solid material. Accordingly, by pulverizing it and making it into a granule or a powder, it can be packaged into a small-sized gas-permeable bag in a high workability and, at the same time, the oxygen absorption velocity can be increased greatly as compared with prior oxygen absorbent containing fatty oils. It has a drying performance, prevents the emission of unpleasant odor and is successfully applicable to preservation of dry foodstuffs and medical drugs and rust prevention of metallic articles.

What is claimed is:

1. An oxygen absorbent comprising:
   ($A_1$) an unsaturated fatty acid and/or a fatty oil containing unsaturated fatty acid,
   ($B_1$) a transition metal and/or a transition metal compound, and
   ($C_1$) a basic substance which is an alkaline earth metal compound of at least one of an an oxide, hydroxide, carbonate, bicarbonate, silicate, phosphate or organic acid.

2. An oxygen absorbent according to claim 1, wherein said ($B_1$) transition metal and/or transition metal compound is at least one transition metal selected from the group consisting of V, Cr, Mn, Co, Fe, Ni, Cu and Zn and/or at least one transition metal compound selected from the group consisting of V compound, Cr compound, Mn compound, Co compound, Fe compound, Ni compound, Cu compound and Zn compound.

3. An oxygen absorbent according to claim 1, wherein said ($A_1$) unsaturated fatty acid and/or fatty oil containing unsaturated fatty acid, ($B_1$) transition metal and/or transition metal compound and ($C_1$) basic substance are so compounded that 0.01 part by weight or more of ($B_1$) and 0.1 part by weight or more of ($C_1$) are compounded with 100 parts by weight of ($A_1$).

4. An oxygen absorbent comprising:
($A_2$) one member or a mixture of two or more members selected from unsaturated fatty acid compounds including unsaturated fatty acids, esters of unsaturated fatty acids and metallic salts of unsaturated fatty acids,
($B_2$) a basic substance which is an alkaline earth metal compound of at least one of an oxide, hydroxide, carbonate, bicarbonate, silicate, phosphate or organic acid, and
($C_2$) an adsorbent.

5. An oxygen absorbent according to claim 4, wherein said unsaturated fatty acid compound is a metallic salt of an unsaturated fatty acid.

6. An oxygen absorbent according to claim 6, wherein said metallic salt of an unsaturated fatty acid is an alkaline earth metal salt, alkali metal salt, transition metal salt or aluminum salt of an unsaturated fatty acid derived from an animal or vegetable oil.

7. An oxygen absorbent according to claim 4, wherein ($A_2$) one member or a mixture of two or more members selected from unsaturated fatty acid compounds including unsaturated fatty acids, esters of unsaturated fatty acid and metallic salts of unsaturated fatty acid, ($B_2$) basic substance and ($C_2$) adsorbent are so compounded that 0.1 to 1,000 parts by weight of ($B_2$) and 50 to 2,000 parts by weight of ($C_2$) are compounded with 100 parts by weight of ($A_2$).

8. An oxygen absorbent according to claim 1 wherein said unsaturated fatty acid contains at least 10 carbon atoms.

9. An oxygen absorbent according to claim 4 wherein said unsaturated fatty acid contains at least 10 carbon atoms.

10. An oxygen absorbent according to claim 1 wherein said unsaturated fatty acid is at least one compound selected from the group consisting of Tohaku acid, linderic acid, tsuzuic acid, oleic acid, linoleic acid, linolenic acid, arachidonic acid, parinaric acid, dimer acid, ricinoleic acid, and the like.

11. An oxygen absorbent according to claim 4 wherein said unsaturated fatty acid compound is at least one unsaturated fatty acid or metal salt thereof selected from the group consisting of Tohaku acid, linderic acid, tsuzuic acid, oleic acid, linoleic acid, linolenic acid, arachidonic acid, parinaric acid, dimer acid, ricinoleic acid, and the like.

12. An oxygen absorbent according to claim 4 wherein said at least one unsaturated fatty acid compound is at least one unsaturated fatty acid, an ester thereof, or a metal salt thereof obtained from the group consisting of linseed oil, soybean oil, tung oil, rice bran oil, sesame oil, tall oil, cotton seed oil, rape seed oil, and the like.

13. An oxygen absorbent according to claim 1 wherein said oxygen absorbent includes a solid material resulting from the reaction of said unsaturated fatty acid and said basic substance.

14. An oxygen absorbent according to claim 4 wherein said oxygen absorbent includes a solid material resulting from the reaction of said unsaturated fatty acid and said basic substance.

15. An oxygen absorbent according to claim 4 wherein said absorbent ($C_2$) comprises silica gel, activated alumina, or active charcoal.

* * * * *